(12) United States Patent
Wais et al.

(10) Patent No.: US 7,123,632 B2
(45) Date of Patent: Oct. 17, 2006

(54) LASER BEAM SOURCE

(75) Inventors: Johannes Wais, Schwieberdingen (DE); Thomas Wawra, Beohmkirch (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 10/450,984

(22) PCT Filed: Dec. 20, 2001

(86) PCT No.: PCT/DE01/04816

§ 371 (c)(1),
(2), (4) Date: Jun. 18, 2003

(87) PCT Pub. No.: WO02/054547

PCT Pub. Date: Jul. 11, 2002

(65) Prior Publication Data

US 2004/0065648 A1    Apr. 8, 2004

(30) Foreign Application Priority Data

Dec. 28, 2000   (DE) ............................... 100 65 529

(51) Int. Cl.
*H01S 3/121*   (2006.01)
*H01S 3/08*    (2006.01)
(52) U.S. Cl. ............................ 372/15; 372/14; 372/99; 372/107
(58) Field of Classification Search ................ 372/30, 372/15, 14
See application file for complete search history.

(56) References Cited

U.S. PATENT DOCUMENTS 3,633,124 A * 1/1972 Danielmeyer ................ 372/30
4,560,856 A   12/1985 Miller
4,724,835 A * 2/1988 Liss et al. ...................... 606/18
4,823,351 A * 4/1989 Endemann et al. ........... 372/20
5,575,935 A   11/1996 Nakata
6,233,268 B1 * 5/2001 Naito ........................... 372/99

FOREIGN PATENT DOCUMENTS

| DE | 37 05 971 A1 | 9/1988 |
| DE | 42 02 941 A1 | 8/1993 |
| EP | 0 065 223 A1 | 11/1982 |

OTHER PUBLICATIONS

H. Huegel "Strahlwerkzeug Laser", Teubner-Verlag, Stuttgat 1992 pp. 1-11, 150-151, 158-165, 168-171, 228-229, 246-249, 264-269, 286-289.
Patent Abstract of Japan 62086851 A Apr. 21, 1987.
Patent Abstract of Japan 62179786 A Aug. 6, 1987.
Patent Abstract of Japan JP10098229 Apr. 14, 1998.

* cited by examiner

*Primary Examiner*—Armando Rodriguez
(74) *Attorney, Agent, or Firm*—Michael J. Striker

(57) ABSTRACT

In a laser beam source for projecting laser pulses, having a laser-active medium (10), a controllable pump device (11) for exciting the medium (10), a resonator (13) for inducing oscillation of the medium (10), which resonator has an end mirror (14) and an output mirror (15) with an orientation axially parallel to the medium (10), for the sake of projecting laser pulses of constant pulse energy immediately upon release of the laser beam source, one of the resonator mirrors (14) is pivotably supported and is pivoted out of its resonator position and back into its resonator position by an actuator (19) at selectable times (FIG. 1).

5 Claims, 2 Drawing Sheets

LASER BEAM SOURCE

BACKGROUND OF THE INVENTION

The invention is based on a laser beam source for projecting laser pulses, in particular for machining material.

Such laser beam sources, embodied for instance as flash lamp- or diode-pumped solid-state lasers, are used among other purposes in machining material, for instance for welding, drilling or cutting (H. Hügel, "Strahlwerkzeug Laser", Teubner-Verlag, Stuttgart, 1992). In it, a controllable shutter following the laser beam source and used for protection purposes is synchronized with the control of the pump device in such a way that first the shutter opens, and then the pulse-controlled flash lamps or diodes excite (pump) the laser-active medium, which in the case of the solid-state laser is the laser crystal. This sequence is maintained in order to prevent the closed shutter from being burned by the laser pulses, but as a consequence of it, in the first laser pulses projected after the activation of the pump device there are fluctuations in the pulse energy, which are caused by the thermal transient-response process of the laser-active medium. These fluctuations in energy have a very adverse effect on the machining process, especially in single-pulse machining, for instance in welding or drilling.

SUMMARY OF THE INVENTION

The laser beam source of the invention for projecting laser pulses has the advantage that the laser-active medium, such as the laser-active crystal, is permanently excited and is thus thermally in equilibrium, by pivoting outward of the resonator mirror from its resonator position, but the laser oscillation is interrupted and thus no laser pulse is generated. As soon as laser pulses are to be projected, then by pivoting the resonator mirror back into its resonator position, in which the normal to the mirror surface is aligned with the normal to the surface of the other resonator mirror or is oriented parallel to it, the lasing process of the medium is enabled. All the laser pulses projected thus—since even when the first laser pulses are projected, the thermal transient-response process has already been concluded—have the same pulse energy, and it is assured that as a result, the outcome of machining, from the very outset, meets the quality desired.

With the shutter disposed between the laser-active medium and one of the resonator mirrors, the process of laser oscillation between the resonator mirrors is blocked by the closure of the shutter and set into motion by the opening of the shutter.

For interrupting the lasing process, only small pivot angles of the pivotably supported resonator mirror are needed, so that in an advantageous embodiment of the invention, a piezoelectric actuator can be used as the actuator. The actuator and the pivotable resonator mirror are advantageously coupled in such a way that when the piezoelectric actuator is not excited, the lasing process is interrupted, or in other words the resonator mirror is pivoted out of its resonator position, and that whenever laser pulses are required, the piezoelectric actuator excited via the control unit pivots the resonator mirror back into its resonator position.

The laser beam source of the invention for projecting laser pulses having the characteristics of claim 7 has the advantage that the laser beam source is always in full operation, and only the beam direction of the laser pulses is shifted, so that in pauses during machining the laser pulses do not reach the machining site.

In one advantageous embodiment of the invention, the deflector device is embodied as a deflector mirror that can be transferred by an actuator into two pivoted positions; the orientation of the deflector mirror in its pivoted positions is accomplished such that the beam direction of the laser pulses in one pivoted position is aimed at a machining site and in the other pivoted position is aimed at a so-called beam sump. The energy of the laser pulses is dissipated in the beam sump. Once again, the requisite pivot angles of the deflector mirror are relatively small, so that a piezoelectric actuator can be used as the actuator.

In an alternative embodiment of the invention, the deflector device is embodied as an acousto-optical modulator, which by applying a high-frequency acoustic power to a so-called Bragg cell diffracts the laser pulse passing through the Bragg cell to the first order and thus pivots it away from the machining site.

BRIEF DESCRIPTION OF THE DRAWINGS

The invention is explained in further detail in the ensuing description in terms of exemplary embodiments shown in the drawing. Shown are.

DESCRIPTION OF THE PREFERRED EMBODIMENTS

Figure 1:
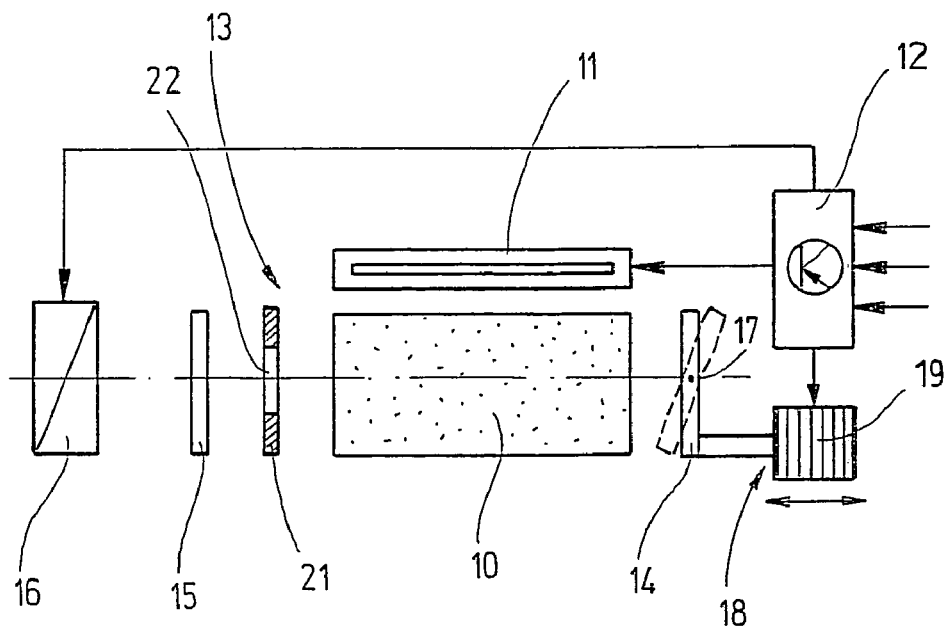
FIGS. 1–4, a block circuit diagram of a laser beam source, in four different exemplary embodiments, respectively.

The laser beam source shown in FIG. 1 for projecting laser pulses, which is used particularly for machining material, has a laser-active medium 10 in a known manner, which by being supplied with energy is transferred from a state of thermodynamic equilibrium into a laser-active state. The energy delivery is effected by means of a controllable pump device 11, which is clocked by a control unit 12; the number of pulses, pulse frequency and pulse length of the laser beam source can be varied by means of the clocking rate and the length of the control pulses. In so-called solid-state lasers, for instance the most important representative of the category in industrial material machining, which is the Nd:YAG laser, the laser-active medium 10 is achieved with a crystal, which is doped with metal ions or rare earth ions as a laser-active medium. In the Nd:YAG laser, the so-called host crystal is an yttrium-aluminum garnet, in which Y ions in the crystal lattice are replaced with Nd (neodymium) ions. The pump device 11 can be a flash lamp or a diode, which is controlled in pulsed form and illuminates the solid-state body or crystal. By means of a resonator 13, which in the simplest case comprises a totally reflective end mirror 14 and a partially permeable output mirror 15, some of the excitation energy made available by the pump device 11 is out-coupled by the laser effect as electromagnetic radiation in the form of laser pulses. The task of the resonator 13 is to send the laser light through the laser-active medium 10 multiple times, as a result of which an amplification process ensues, and the laser lases; that is, laser oscillation begins. In this state, an equilibrium is established between the energy delivered to the laser-active medium 10 and the energy output in the form of laser radiation by the output mirror 15. A so-called shutter 16 is also located behind the output mirror 15 in terms of the beam direction; it has a protective function and is closed when the laser beam source is turned off. Upon actuation of the laser beam source, the shutter 16 is opened by the control unit 12. A diaphragm 21 with an aperture 22 disposed between the laser-active medium 10 and the output mirror 15 serves to improve the beam quality of the laser radiation.

To prevent the shutter 16 from being burned by laser pulses, the control of the shutter 16 is harmonized with the control of the pump device 11 in such a way that first the shutter 16 opens, and then the pump device 11 pumps the laser-active medium 10. To prevent the projection of laser pulses with fluctuations in pulse energy during the thermal transient-response process, which ensues at the onset of pumping, in the laser-active medium 10, which is not yet in thermal equilibrium, blocking means for suppressing the lasing process of the laser-active medium 10 are disposed in the resonator 13, and they can be deactivated at selectable times for a selectable length of time. The times for deactivation of the blocking means are set such that the thermal transient-response process of the laser-active medium 10 is concluded, and this medium has reached its thermal equilibrium. The selected length of time depends on the duration of machining. The deactivation advantageously occurs between two lighting pulses by the flash lamp or diode.

In the exemplary embodiment of FIG. 1, the blocking means have a pivot bearing 17 for the end mirror 14 in the resonator 13 and an actuator 18, which adjusts the pivotably supported end mirror 14 and which is embodied here as a piezoelectric actuator 19 controlled by the control unit 12. As long as the lasing process of the laser-active medium 10 is to remain suppressed despite pumping by the pump device 11, or in other words as long as the blocking means are operative, the end mirror 14 assumes its position shown in dashed lines in FIG. 1, in which it is pivoted out of its resonator position. The resonator position is defined in that the normals of the two resonator mirrors 14, 15 are aligned with one another or oriented parallel to one another, so that a wave train of the electromagnetic waves emitted spontaneously in the laser-active medium 10 passes through the medium 10 multiple times by reflection from the two resonator mirrors 14, 15 and is amplified because of induced emission until such time as so-called laser oscillation ensues. If the end mirror 14 is transferred to its position shown in dashed lines in FIG. 1, then the wave train reaching it, emitted in the axial direction by the laser-active medium 10, is reflected in a different direction and does not arrive back at the medium 10. The amplification process cannot ensue in that case, and the laser cannot lase.

If a laser pulse train is required for machining material, then the control unit 12 triggers the piezoelectric actuator 19, and the piezoelectric actuator pivots the end mirror 14 into the resonator position shown in solid lines in FIG. 1, in which the amplification process described above ensues, and the laser beam source projects the pulse train. The control of the piezoelectric actuator 19 is effected between two successive lighting pulses of the flash lamp or diode, so that the return process of the end mirror 14 is concluded once the second lighting pulse has been projected. Since only the lasing process of the medium has been blocked, but not the pumping of the medium 10 by the pump device 11, the medium 10 is in thermal equilibrium when the end mirror 14 pivots into its resonator position, and all the laser pulses projected by the laser beam source have the same, constant pulse energy.

It is understood that is possible, instead of the end mirror 14, also to provide the output mirror 15 with a pivot and to couple it with the piezoelectric actuator 19. The mode of operation is the same as that described above.

Figure 2:
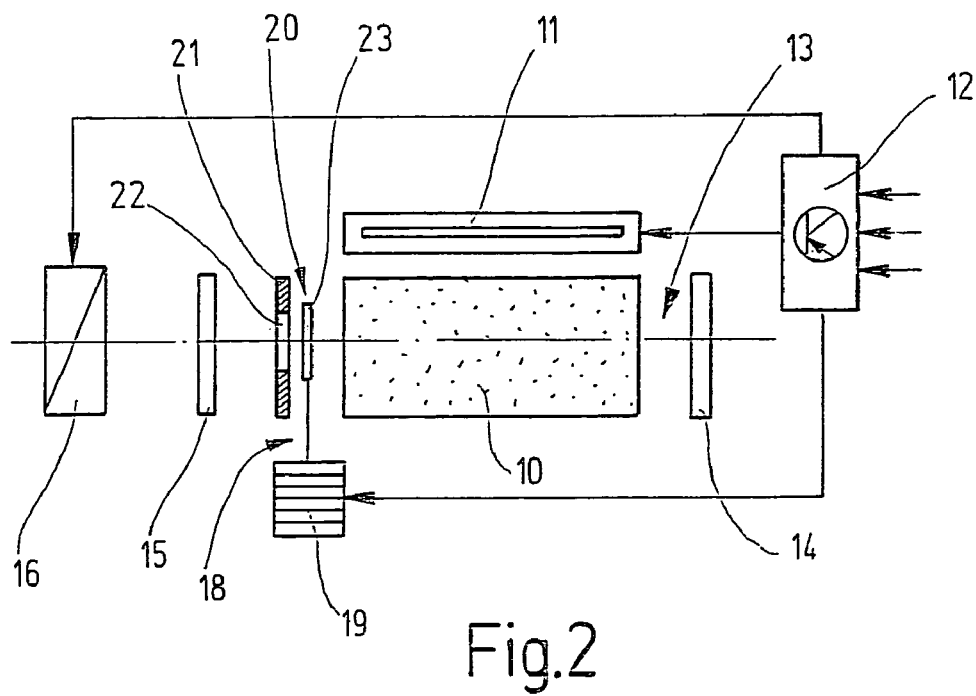

In the exemplary embodiment of FIG. 2, the blocking means for suppressing the lasing process of the laser-active medium 10 have a shutter 20 and an actuator 18 that is actuated by the shutter 20. The actuator 18 is in turn embodied as a piezoelectric actuator 19, which is triggered by the control unit 12 for opening and closing of the shutter 20. The shutter 20 disposed between the output mirror 15 and the laser-active medium 10 likewise, in the closed state, prevents the lasing of the medium 10, since because of the shielding of the output mirror 15 from the medium 10, the above-described amplification and oscillation process cannot ensue. Not until the shutter 20 is opened are the lasing conditions for the laser established, and the laser beam source projects the laser pulses, whereupon even the first laser pulse has the same pulse energy as those that follow it.

The shutter 20 can be embodied in various ways. In the exemplary embodiment of FIG. 2, the shutter 20 has a diaphragm 21 and a shielding plate 23 that covers the aperture 22 and that is moved by the piezoelectric actuator 19 transversely to the resonator axis and can thus be moved out of the resonator 13 or into the resonator 13. The motion can be executed by transverse displacement or pivoting of the shielding plate 23. When a laser pulse train is called up, the control unit 12 first opens the shutter 16 and then subsequently moves the shielding plate 23 out of the resonator 13, so that the lasing conditions in the resonator 13 are established.

It is understood that it is also possible for the shutter 20 or the shielding plate 23 to be disposed between the laser-active medium 10 and the end mirror 14 and to be actuated in the same way by the piezoelectric actuator 19 controlled by the control unit 12. In the exemplary embodiments of the laser beam source in FIGS. 3 and 4, for generating laser pulses of constant, unfluctuating pulse energy, an intervention is made not into the resonator 13; instead, a deflector device 24 is disposed in the laser beam path from the laser beam source to a workpiece 24 that is to be machined, and upon its activation the deflector device shifts the beam direction of the laser pulses such that they do not reach the workpiece 24 but instead reach a so-called beam sump 26, where the pulse energy is dissipated. For calling up laser pulses to the workpiece 24, the activation of the deflector device 25 is discontinued again, so that the laser pulses strike the machining site 28 on the workpiece 24. Since the laser is already in operation by the time the first laser pulse is called up to the machining site 28, all the laser pulses have the pulse energy from the very outset. The layout of the resonator 13, with the flash lamp 11, the control unit 12, and the diaphragm 21 located in front of the output mirror 15 and the shutter 16 located behind it is unchanged, so that identical components are identified by the same reference numerals.

Figure 3:
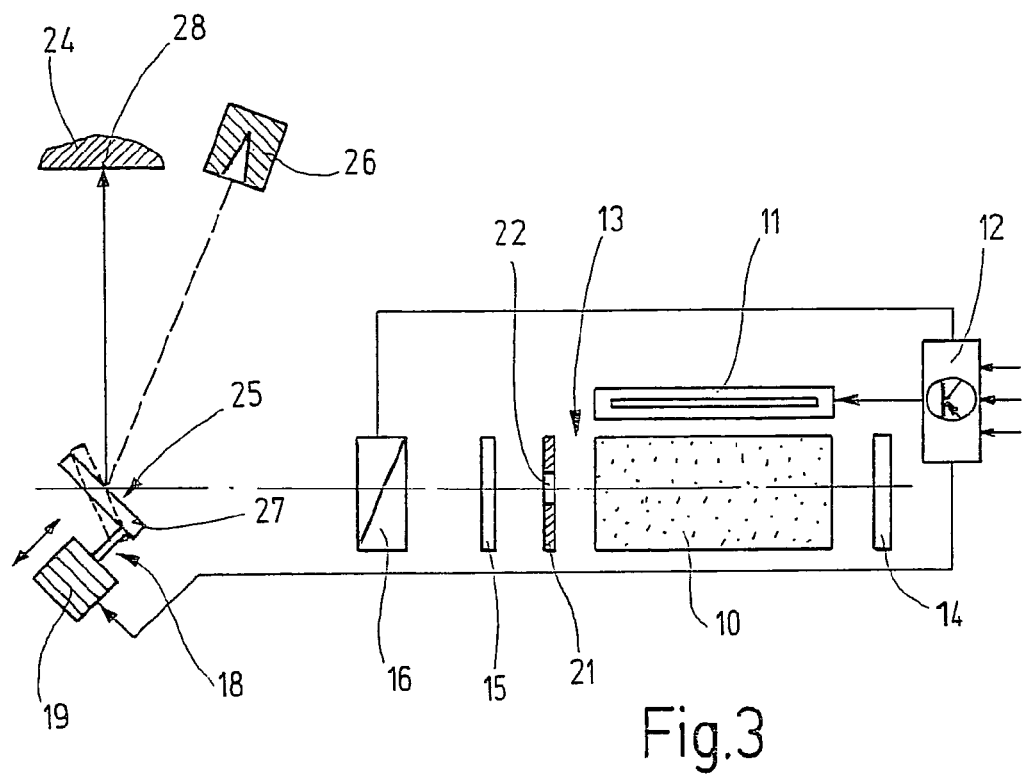

In the exemplary embodiment of FIG. 3, the deflector device 25 is embodied as a deflector mirror 27, which can be transferred by an actuator 18 into two pivoted positions. The orientation of the deflector mirror 27 in its two pivoted positions is then done in such a way, in agreement with what has been said above, that the beam direction of the laser pulses in one pivoted position is aimed at the machining site 28 on the workpiece 24 and in the other pivoted position is aimed at the beam sump 26. Once again, the actuator 18 is preferably embodied as a piezoelectric actuator 19, which needs to adjust the deflector mirror 27 by only a small pivot angle. It is understood that it is possible to orient the deflector mirror 27 such that when the piezoelectric actuator 19 is unexcited, it assumes the position shown in dashed lines in FIG. 3, and is converted into the pivoted position shown in solid lines in FIG. 3 by the piezoelectric actuator 19 that is acted upon by a control signal from the control unit 12.

Figure 4:
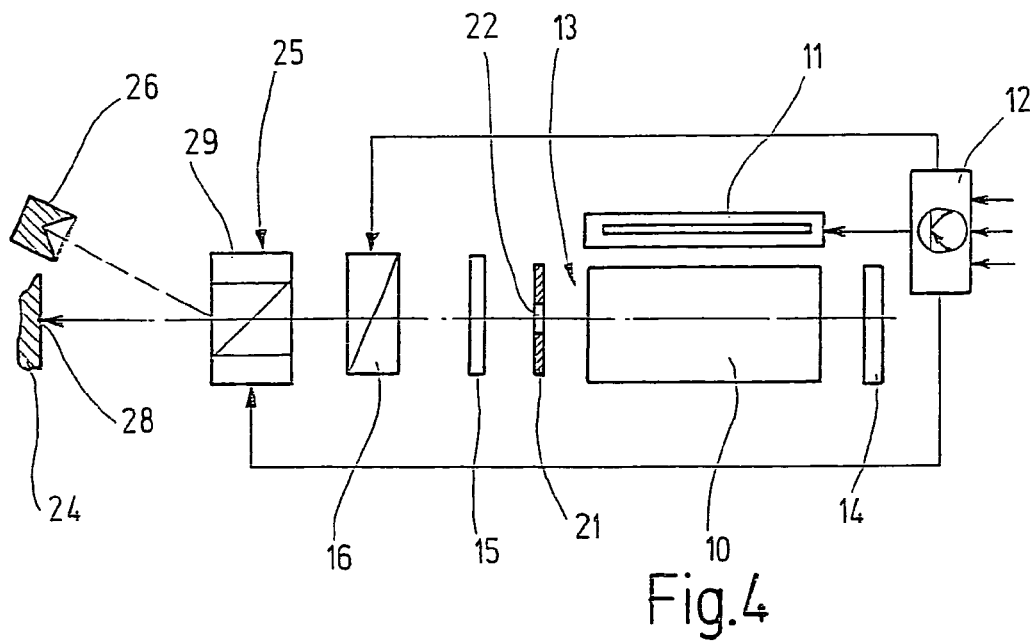

In the exemplary embodiment of FIG. 4, the deflector device 25 is embodied as an acousto-optical modulator 29. One such acousto-optical modulator is described in terms of its layout and mode of operation in the catalog "Akusto-Optik" [Acousto-Optics], 1999, for instance, put out by ELS Elektronik Lasersystem GmbH, Groβ-Zimmern. Such an acousto-optical modulator comprises a Bragg cell, in which the interaction between sound and light takes place. The acoustic power is fed into the Bragg cell by means of a transducer. If the Bragg cell is triggered with a suitable high-frequency power, then periodic changes in the index of refraction develop in the interior of the cell. The laser beam or laser pulse passing through is diffracted by this change in the index of refraction and is directed away from the machining site 28 toward the beam sump 26. Otherwise, the layout of the laser beam source is equivalent to that described for FIG. 3, and so identical components are identified by the same reference numerals.

The invention claimed is:

1. A laser beam source for projecting laser pulses for machining material, comprising a laser-active medium; a pump device for exciting said medium; a resonator for inducing oscillations in said medium, said resonator having an end mirror and an output mirror each forming a part of said resonator for inducing oscillations in said medium and each with an orientation axially parallel to said medium; a control unit for controlling a number of pulses, a pulse frequency, and a pulse length, one of said mirrors of said resonator being supported pivotally; an actuator engaging said one mirror which is pivotally supported, for pivoting said one mirror, which forms a part of said resonator for inducing oscillations in said medium, out of a resonator position and for pivoting said one mirror back into the resonator position at selectable times so as to influence laser oscillations.

2. A laser beam source for projecting laser pulses for machining material, comprising a laser-active medium; a pump device for exciting said medium; a resonator for inducing oscillations in said medium, said resonator having an end mirror and an output mirror each with an orientation axially parallel to said medium; a control unit for controlling a number of pulses, a pulse frequency, and a pulse length, one of said mirrors of said resonator being supported pivotally; an actuator engaging said one mirror which is pivotally supported, for pivoting said one mirror out of a resonator position and for pivoting said one mirror back into the resonator position at selectable times, wherein said control unit is farmed so as to control said actuator so that the pivoting back of said one mirror of said resonator and opening of a shutter are each effected between two excitation pulses of said pump device.

3. A laser beam source as defined in claim 1; and further comprising a shutter which intervenes between said laser-active medium and said one mirror of said resonator.

4. A laser beam source for projecting laser pulses for machining material, comprising a laser-active medium; a pump device for exciting said medium; a resonator for inducing oscillations in said medium, said resonator having an end mirror and an output mirror each with an orientation axially parallel to said medium; a control unit for controlling a number of pulses, a pulse frequency, and a pulse length, one of said mirrors of said resonator being supported pivotally; an actuator engaging said one mirror which is pivotally supported, for pivoting said one mirror out of a resonator position and for pivoting said one mirror back into the resonator position at selectable times, wherein said actuator has a piezo-electric actuator.

5. A laser beam source as defined in claim 2, wherein said output mirror is followed, in a laser projection direction, by a protective shutter, said protective shutter being triggered by said control unit so that it opens before pivoting the one mirror of the resonator back again and before opening said shutter.

* * * * *